United States Patent Office 3,402,639
Patented Sept. 24, 1968

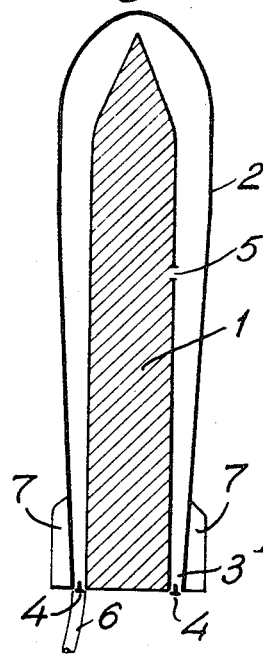
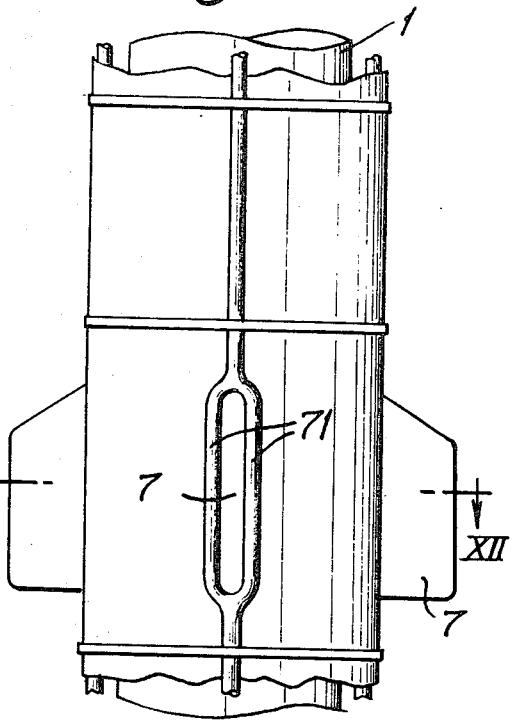
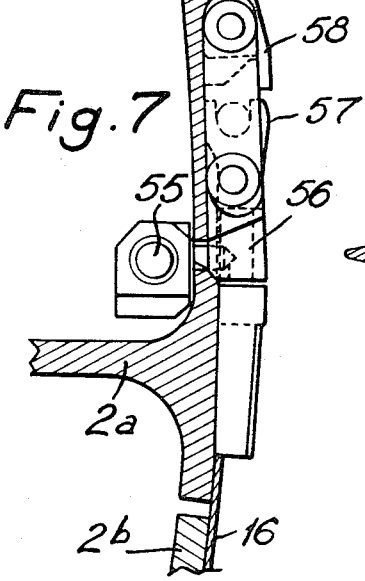
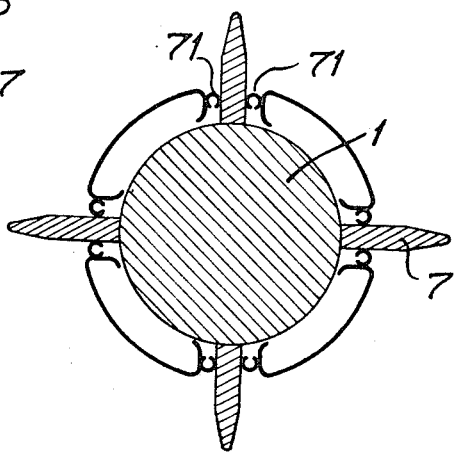

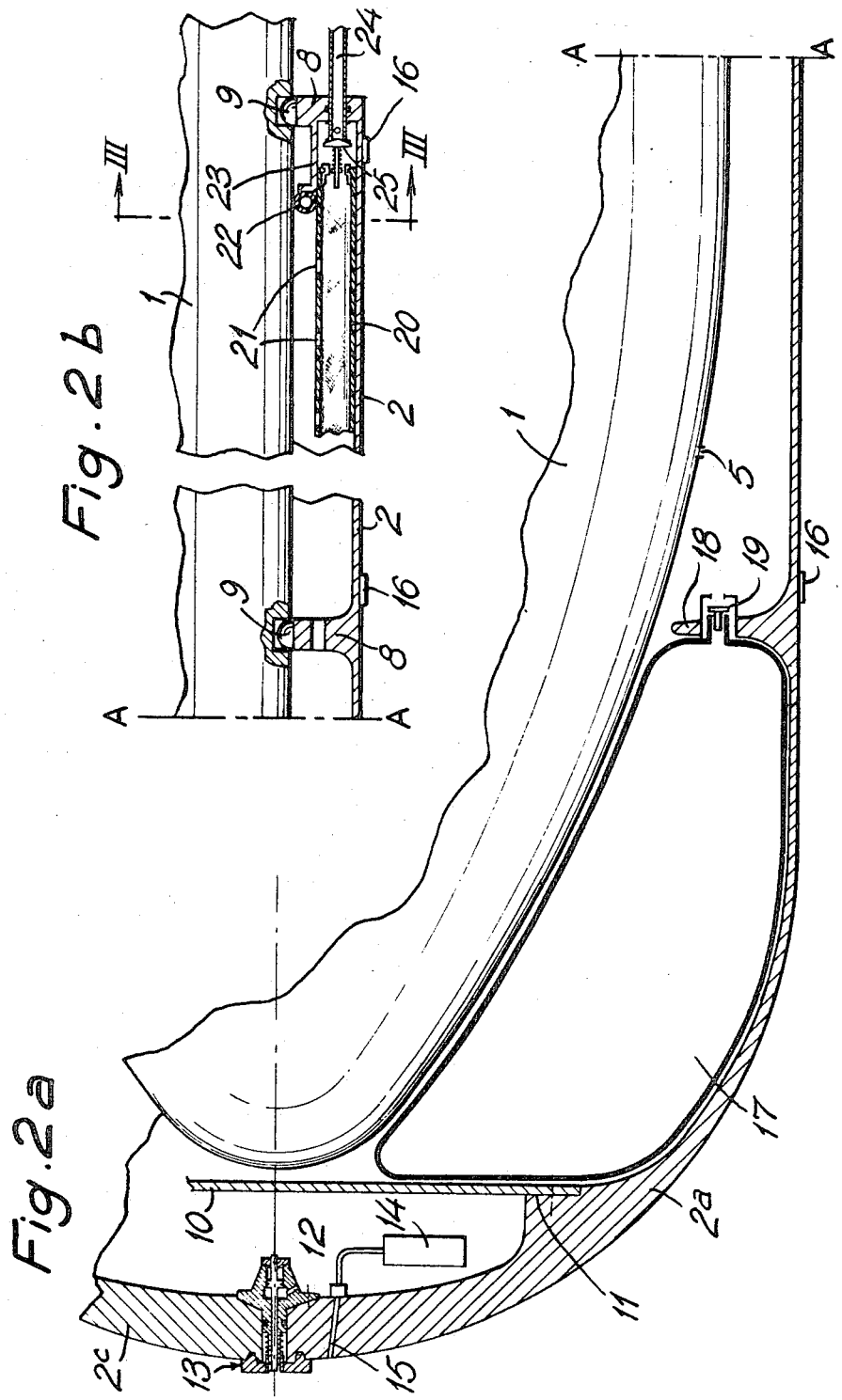

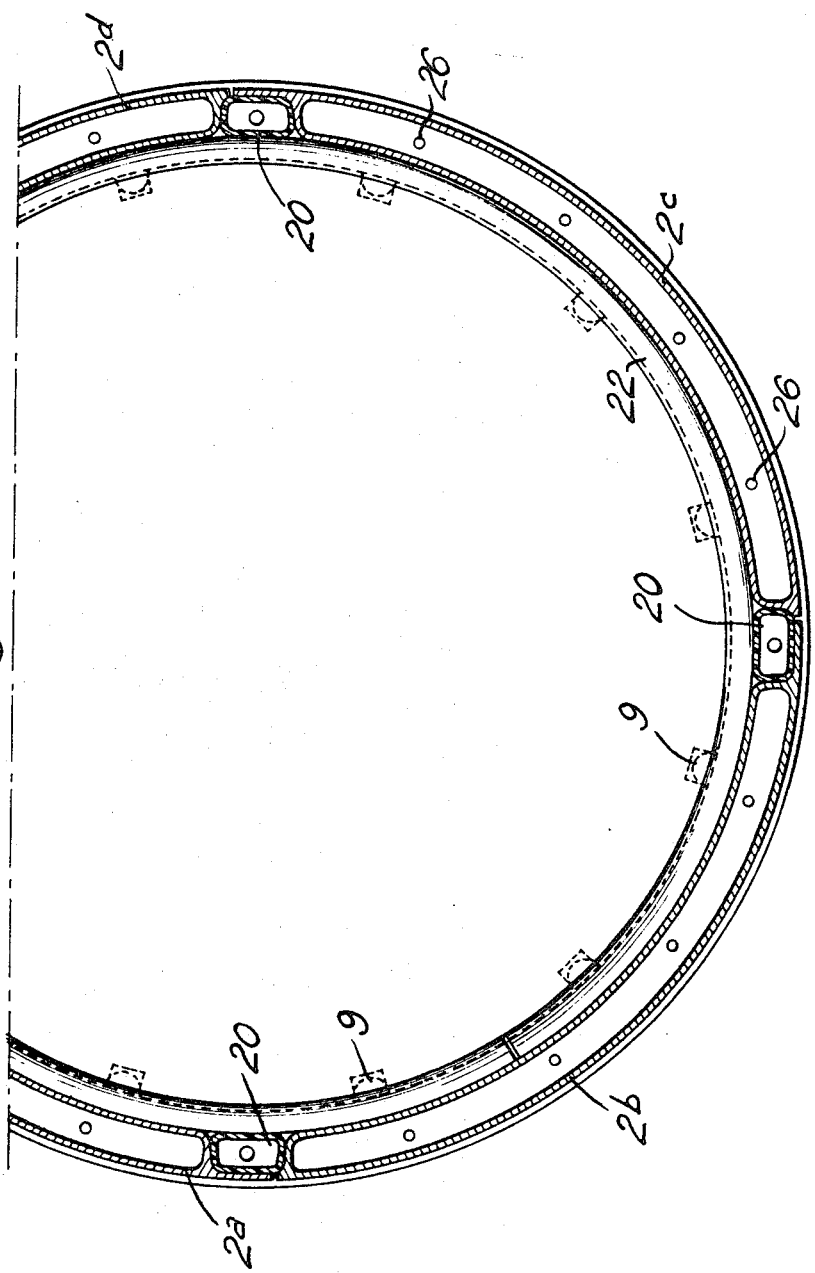

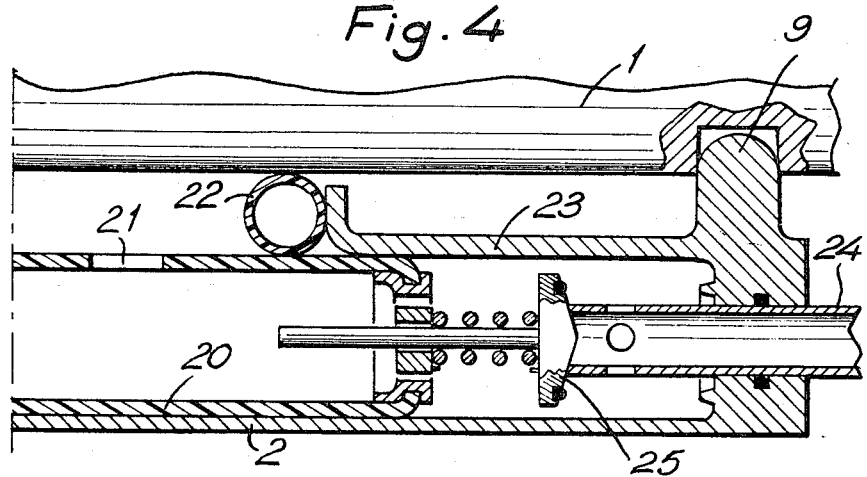
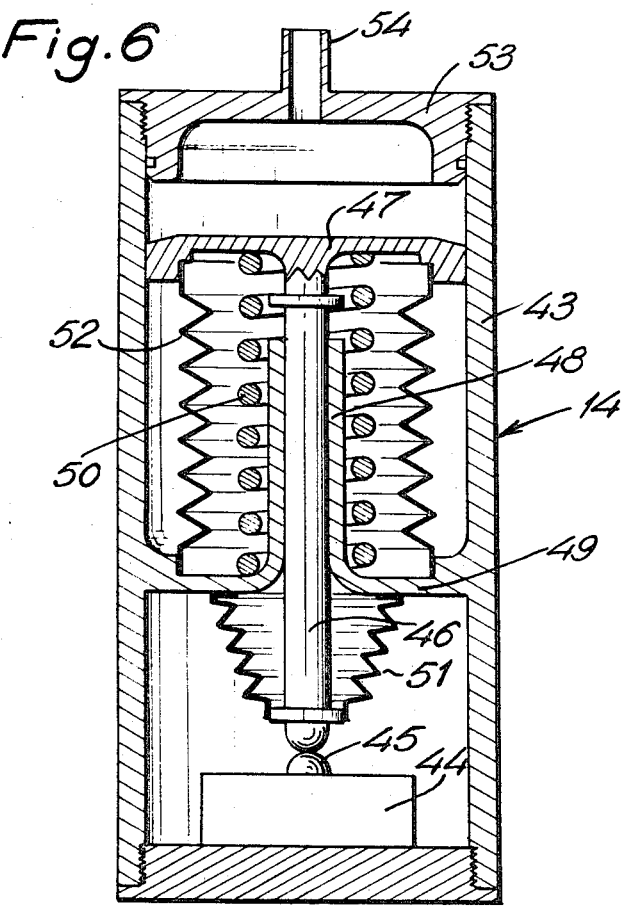

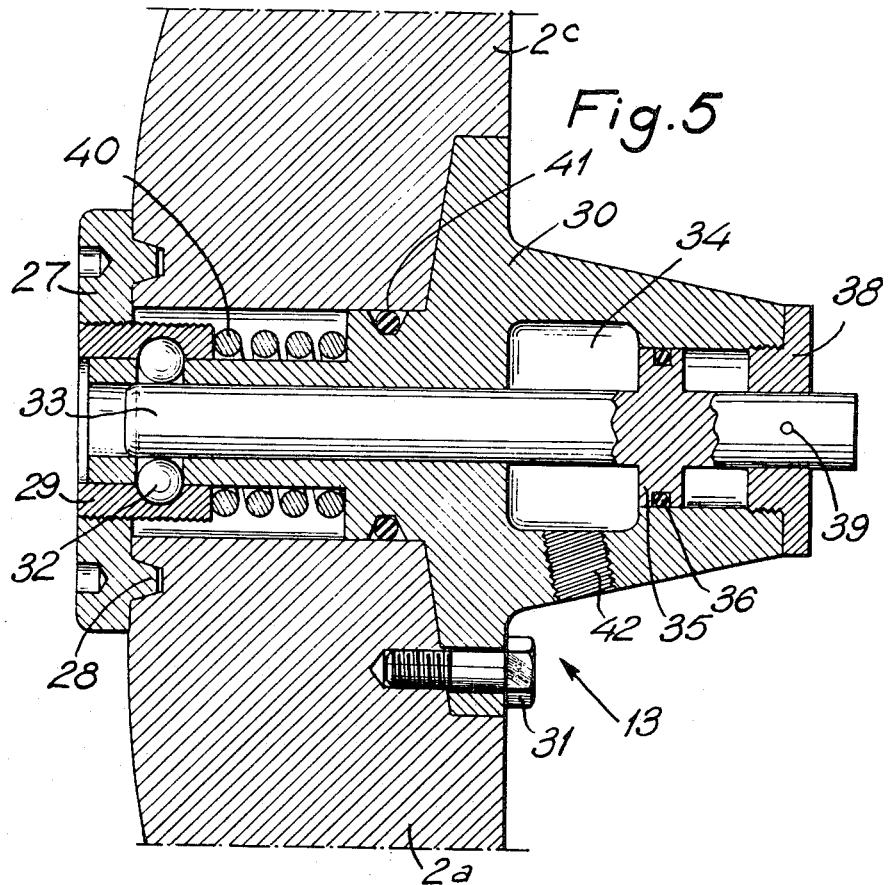
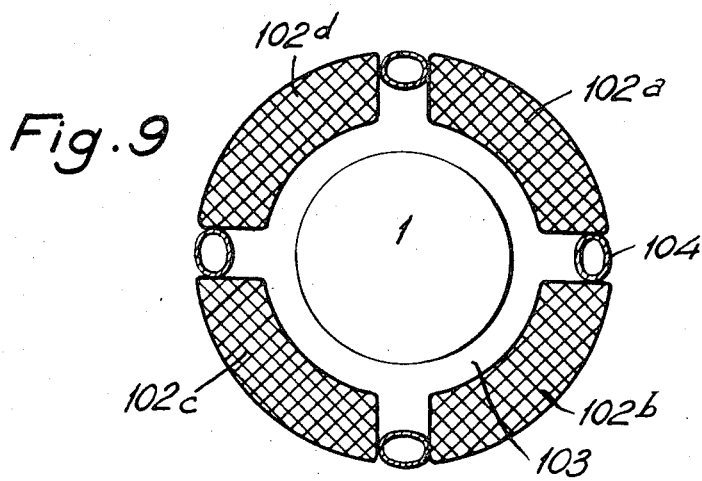

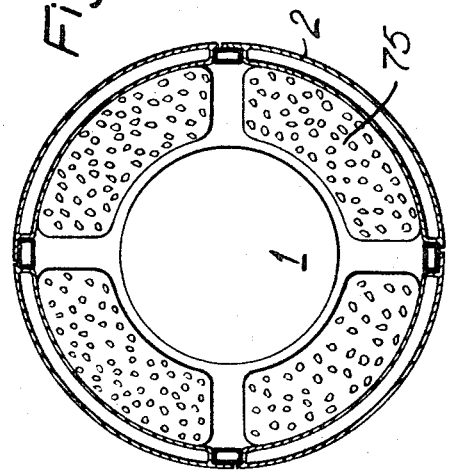
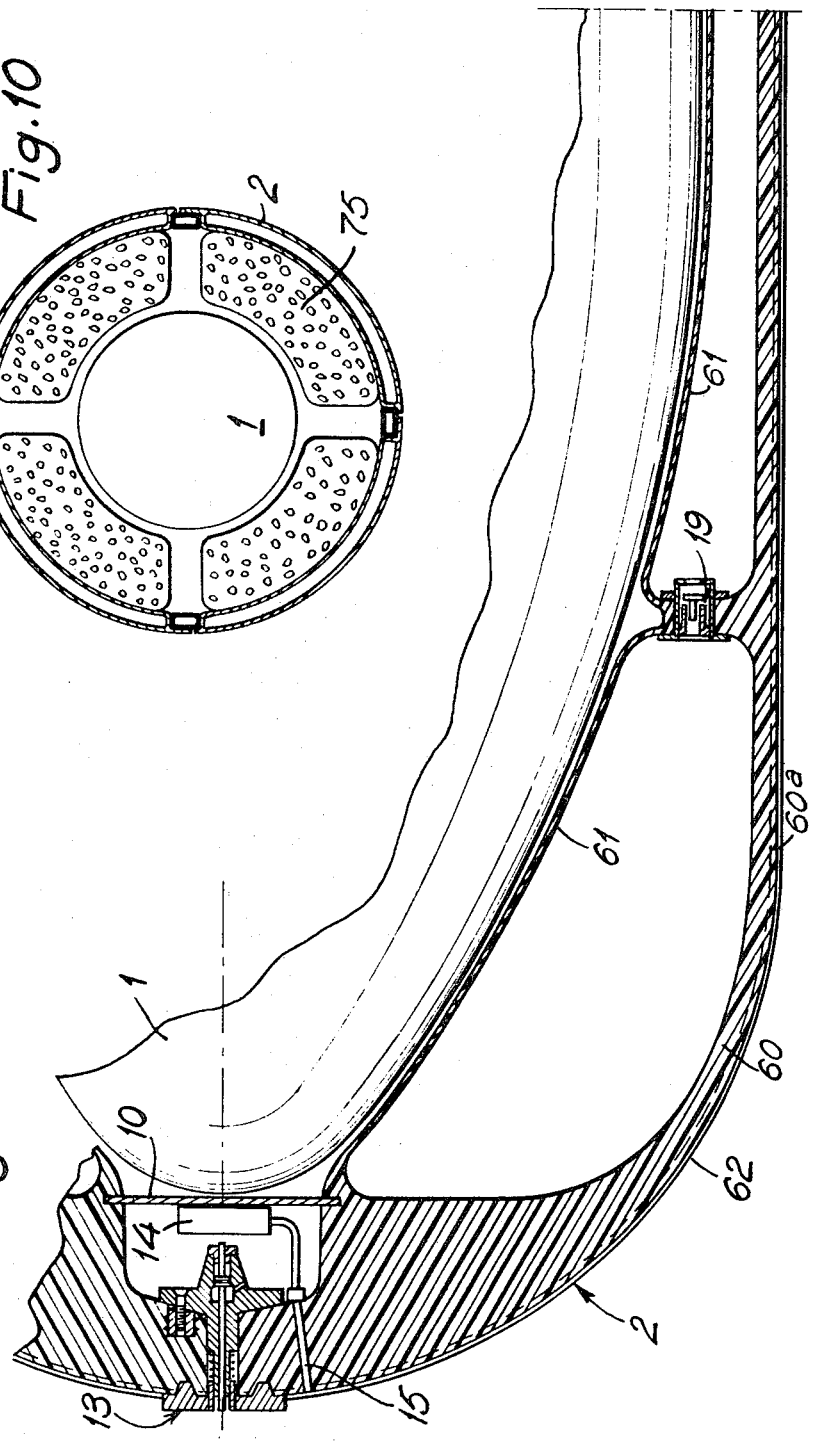

3,402,639
SYSTEM FOR PROPELLING A DEVICE UNDER WATER
Roger Henri Beteille, La Napoule, and Marcellin Marie Laurent, Cannes, France, assignors to Sud-Aviation Societe Nationale de Constructions Aeronautiques, Paris, France
Filed Oct. 21, 1966, Ser. No. 588,417
Claims priority, application France, Oct. 28, 1965, 36,494
12 Claims. (Cl. 89—1.809)

ABSTRACT OF THE DISCLOSURE

A pod surrounding at least a part of a missile casing during underwater trajectory thereof and separating itself completely from said missile at its exit from the water whereby said missile alone follows its aerial trajectory. The pod is constituted by light longitudinal sections mutually interconnected by locking means and fluid tight means, the value of the pressure inside the space enclosed between the pod and the missile being regulated, by a suitable device, equal or above the hydrostatic pressure that prevails at the external wall of said pod in the water, means being further provided for releasing said locking means when a change in pressure occurs upon emergence from the water.

---

This invention relates to a system permitting underwater propulsion, possible vertical erection, and ejection out of the water of a device such as an aircraft or a missile designed to follow an underwater trajectory followed by an aerial trajectory, as for example subsequent to launching from a submerged submarine.

In what follows reference will be made throughout to a missile, though it is to be understood that the invention is by no means limited to such a device but that its scope includes any device or vehicle adapted to follow a composite trajectory partly in water and partly in the air.

The systems customarily used for this purpose include a launching means such as a vertical shaft enabling the missile to be launched in the desired direction at sufficiently high speed for it to break out of the water under satisfactory conditions, or a self-contained device such as a propeller for propelling the missile through water, or else the propulsion unit (e.g. of the solid propellant type) normally provided for the aerial portion of the trajectory but which in such a case would be utilized underwater also.

The first of these systems can be used only down to a limited depth and imposes special installation and launch requirements. The second prohibits the use of high propulsive power and is furthermore heavy and complex, while the third involves great weight and is therefore of very low efficiency. In addition, the last-mentioned two systems call for the concurrent use of a steering system for controlling the trajectory and ensuring that the missile emerges from the water under satisfactory conditions.

It is the object of the present invention to overcome these drawbacks by imparting natural buoyancy to the missile and to thereby provide both the vertical force required to propel the missile along its underwater trajectory and the erection moment which will assist in obtaining and then maintaining a trajectory near enough to the vertical to ensure correct emergence from the water.

The invention relates to a buoyancy pod which is associated with a missile during the underwater trajectory thereof and which separates entirely from said missile either as soon as the latter emerges from the water or at a subsequent stage, whereby to allow the missile to continue its trajectory through the air alone. The pod, which is made of a light material or an elastic material, consists of longitudinal members interconnected by bolts and/or straps which are released at the required instant by explosive release means or any other convenient means adapted to separate said members.

The space included between the pod and the enclosed missile is filled with a gas, such as air, at a pressure close to the hydrostatic pressure prevailing at the launching depth. Suitable calibrated valves located at the rear end of the system maintain substantially equal pressures within and without the pod throughout the underwater trajectory, and also maintain, on emergence of the missile from the water, a pressure within the pod that is sufficient to assist separation of the members forming said pod.

Leaktightness between the pod members is ensured by flexible seals and/or inflatable bladders.

In an alternative form of embodiment of the invention suitable for shallow depths, the pressure inside the pod is not balanced by the pressure outside the same but is sufficiently high to facilitate separation of the pod members on emergence of the missile from the water.

The description which follows with reference to the accompanying non-limitative exemplary drawings will give a clear understanding of how the invention can be carried into practice.

In the drawings:

FIGURE 1 shows in schematic longitudinal section an underwater propulsion system according to the invention.

FIGURES 2a and 2b are partial longitudinal sectional views of a system according to the invention, which join along the line A—A.

FIGURE 3 is a cross-section taken through the line III—III of FIGURE 2b.

FIGURES 4 to 7 show in longitudinal section, on an enlarged scale, various details of the views in FIGURES 2a and 2b, to wit, the pressurizing gas inlet, the central locking device, the barometric contact switch and a securing-strap lock, respectively.

FIGURE 8 shows in diagrammatic longitudinal section an alternative form of embodiment of the system according to the invention.

FIGURES 9 and 10 show in cross-section alternative constructional forms of the system according to the invention.

FIG. 11 shows in partial side elevation a propulsion unit according to the invention equipped with steering fins; and FIG. 12 is a diagrammatic section taken on the line XII—XII of FIG. 11.

In the specific form of embodiment shown diagrammatically in FIG. 1 of a system for ensuring proper emergence from the water of a missile 1, said system is comprised of a pod 2, of a body of revolution for instance, made of a light material. Before the composite device is launched (from a submarine for example), the space between missile 1 and pod 2 is filled with a compressed gas, such as air, at a pressure close to the hydrostatic pressure at the launching depth.

Pod 2 is shaped to offer low hydrodynamic drag and the internal volume distribution is predominant at the nose end to ensure high hydrostatic stability in the vertical position. The total volume V of the assembly comprising missile 1 and pod 2 is defined by the value of the force required to propel this assembly of known mass vertically through the water at some determinate speed $v$, and is given by the formula:

$$V = \frac{\frac{1}{2}\rho v^2 S C_D + Mg}{\rho g}$$

where:

$v$ = selected vertical velocity of missile in m./sec.

$\rho$ = density of the water in kg./m.$^3$.
$SC_D$ = coefficient of resistance to forward motion in m.$^2$.
$M$ = mass of the assembly in kg.
$g$ = acceleration of gravity in m./sec.$^2$.

The lower part of the volume between pod 2 and missile 1 is vented through one or more ports 3 fitted with valves 4 which enable the required internal overpressure to be maintained during the rising motion while at the same time limiting such overpressure to a value low enough not to require an unduly strong pod structure. In order to enable the structure of missile 1 to be lightened, it will be advantageous furthermore to balance the internal pressure of said missile with the pressure prevailing between the missile and the pod, this being accomplished by means of orifices 5 formed in the missile casing. Valves 4 may be extended rearwardly by flexible ducts 6 designed to avoid the formation of a large gas bubble behind the system, which could be detrimental to stability.

Possibly foldable fins 7 ensure, where necessary, hydrodynamic stability at launch in order that the hydrostatic moment shall always remain dominant. These fins also improve the aerodynamic stability of the missile during the aerial portion of its trajectory.

In order not to encumber the missile 1 with the pod 2 during its trajectory through the air, the pod is devised in such manner as to separate from the missile when same emerges from the water.

Pod 2 is accordingly formed of a plurality of longitudinal segments or shells secured together by bolts and the pod is adapted to splay open on separation, for example by causing the dynamic pressure to be admitted through an uncovered orifice at the front of the system and the pod elements to be disunited by known means.

In the embodiment shown in FIGS. 2a and 2b, pod 2 includes no aerodynamic surface rigidly connected to missile 1. The latter is enclosed, at least over its front portion, by four 90-degree elements 2a through 2d (see FIG. 3) which form the pod 2 proper and may be made for instance of light alloy sheeting. Each element includes two internal annular frame quadrants 8 carrying ball-ended locating pegs 9 adapted to engage in recesses formed on the surface of the missile and enabling longitudinal and transverse loads to be transmitted between the missile and pod 2. One of the four pod elements (e.g. element 2a) carries a front sealing disc 10 which engages in a circular channel 11 and segregates a housing 12 at the front end of the pod. The same element 2a further supports a central locking device 13, which rigidly unites the four elements 2a through 2d at a point proximate to the nose of the pod, and a pod release control circuit, the pod jettisoning system operating for instance by explosive impulses and comprising a barometric contact switch 14 which is activated by a pressure takeoff 15 opening out at the nose of the pod and which in turn operates the impulse generators of central lock 13 and causes the pod girdling straps 16 to be released. These various devices will be described in greater detail hereinafter.

To the rear of sealing disc 10, beneath each quarter-pod 2a through 2d, is accommodated a bladder 17 whose expanded volume is bounded by disc 10, the skin of pod 2, the casing of missile 1 and a sealing ring 18 divided into quadrants each of which is rigidly united to the inner face of one of the pod segments. Each bladder 17 communicates with the rear through a double valve 19 which enables pressurizing gas to be admitted prior to launch and, during the underwater trajectory, to escape to the rear into the space between the pod and the missile. The valves 19 are calibrated to enable a constant overpressure to be maintained in the front part of the missile until the latter emerges from the water. As FIG. 3 clearly shows, the volume bounded by the four pod elements 2a to 2d rearwardly of bladders 17 is kept leaktight by inflatable rubber seals 20 accommodated in four longitudinal channels formed along one edge of the four elements 2a through 2d, the inner face of seals 20 being formed with holes 21 (see FIG. 2b) for supplying gas to the internal volume. An O-ring 22 located at the rear between missile 1 and pod 2 and which reacts against an annular abutment 23 rigid with the latter, ensures added leaktightness.

The rear end of each of the four longitudinal seals 20 extends into a housing into which leaktightly penetrates a pressurizing air inlet 24 fitted with an inlet non-return valve 25. This device, which is shown on an enlarged scale in FIG 4, is operated at the moment of launch.

Each pod element 2a through 2d is equipped with a number of pressure balancing valves 26 (see FIG. 3) which are calibrated so as to permit discharge of the pressurizing gas during the underwater trajectory while at the same time retaining an internal overpressure sufficient to ensure leaktightness by means of inflatable seals 20 and bladders 17. This overpressure constitutes the reserve power needed to splay open the four pod elements from the front at the required instant, that is to say half a second to one second after emergence from the water.

The locking device, generally designated by reference numeral 13, rigidly unites the front ends of the four sections 2a through 2d forming the pod 2, at the nose end thereof, and is shown in detail in FIGURE 5. It consists basically of an axially threaded disc 27 applied against the nose of the pod and formed with an annular ridge 28 which engages into a groove formed in the four pod elements whereby to maintain same in position. Disc 27 is in turn secured by a threaded sleeve 29 to a hollow core-piece 30 extending axially through the nose of the pod and secured to one of the segments thereof (e.g., segment 2a) by means of screws 31. Sleeve 29 is screwed into the threaded bore of disc 27 and is rigidly united with the hollow core-piece 30 extending therethrough by means of balls 32 trapped in lodgings formed jointly in sleeve 29 and in a circular groove embodied in core-piece 30. These lodgings open out into an axial passage extending through core-piece 30, the balls being restrained in said lodgings by a rod 33 slidably mounted in said passage, which passage opens into an explosion chamber 34 formed in core-piece 30 and bounded at the rear by a piston 35 fitted with a seal 36. Rod 33 is retained in position by a cover 38 through which it extends and which is screwed into the rear end of hollow core-piece 30, a shear-pin 39 extending through both rod 33 and cover 38. Lastly, a compressed coil spring 40 inserted between sleeve 29 and an annular thrust seat on core-piece 30 tends to eject disc 27 forward, an O-ring 41 ensuring fluidtightness between hollow core-piece 30 and segments 2a through 2d.

A powder-type igniter (not shown) is screwed into a tapped hole 42 in a core-piece 30 and projects into explosion chamber 34. It will readily be appreciated that ignition of this device will produce a high overpressure in chamber 34, thereby thrusting piston 35 rearwardly and shearing the pin 39, whereby rod 33 rigid with piston 35 will uncover the lodgings of balls 32, causing the same to be thrust into the axial passage through core-piece 30 under the action of spring 40. Sleeve 29 is thereby disunited from core-piece 30 and is ejected forward by spring 40, thus releasing the pod segments 2a through 2d from the retention ridge 28, thereby allowing the pod segments to splay open.

The barometric contact switch 14 which controls opening of central locking device 13 and straps 16 is shown in detail in FIGURE 6. It consists basically of a hollow cylinder 43 to the bottom of which is fixed a microswitch 44 whose operating contact stud 45 is in contact with an axial rod 46 rigidly connected at its other end to a piston 47 which closely hugs the inner wall of cylinder 43, said rod 46 being slidable through a sleeve 48 whose lower end flares out into a partition wall 49 the perimeter of which is integral with the inner surface of cylinder 43. A calibrated compression spring 50 which surrounds sleeve 48 thrusts against piston 47 and reacts against partition wall 49.

Rod 46 is encased in two bellows 51 and 52, of which the former is fitted sealingly between the face of wall 49 and the end of rod 46 in contact with stud 45, and the latter is sealingly mounted between wall 49 and piston 47. A vacuum prevails within both these bellows.

Cylinder 43 is closed at its end proximate to piston 47 by a threaded cover 53 which has extending therethrough a nozzle 54 connected to the pressure takeoff 15 opening externally at the nose of the podded missile. Spring 50 is calibrated so that any change in pressure occurring on emergence of the podded missile from the water shifts rod 46 which theretofore pressed against microswitch 44, thereby triggering a contact which causes time-delayed release of central locking device 13 and straps 16.

The device for locking straps 16, shown in FIGURE 7, is similar to that described in French patent Ser. No. 1,390,152 of July 1, 1960, and need not be described in detail; it will suffice merely to note that the action of a powder-type igniter 55 on a clevis-lever 56 disengages two mutually buttressed parts 57 and 58 and thereby releases the two ends of strap 16.

For a clear understanding of the subject system of this invention, consider a missile encased in a pod as hereinbefore described and launched from a submarine submerged to a depth of 130 metres. The missile is launched with an initial velocity relative to the water of 10 metres/sec., which velocity is the sum of the 5 metre/sec. forward speed of the submarine and the 5 metre/sec. velocity of the missile relative to the launching tube fixed to the submarine. It is further assumed that the missile is launched conventionally from a torpedo-tube having a forward breech door which is opened prior to launch and after the pressures inside and outside the torpedo-tube have been approximately balanced. A conventional servo-system also equilibrates the pressure inside the torpedo-tube with the pressures prevailing beneath sections 2a through 2d of pod 2.

In the specific example considered, the composite system of the invention is filled with gas at a pressure of 13.9 bars (relative) or 14.9 bars (absolute), through the four inlets 24 uniting its rear end with the launch tube. This pressure of 13.9 bars is the sum of the hydrostatic pressure of 13 bars, the hydrodynamic pressure of 0.3 bar and the overpressure of 0.6 bar resulting from the tare on the valves 25 at the rear of the pod.

The rear end of at least one of the four pod sections is fitted with connectors (not shown) which pull out at blast-off and provide the necessary electrical and pneumatic links with the fire control station. These connectors are naturally of the sealed type and are connected respectively through piping and electric cables to corresponding connectors on the missile casing. Jettisoning of the pod on emergence from the water causes these connectors to be detached and jettisoned at the same time.

Thus, during the waiting phase, the interior of the missile is linked to the fire control station through a so-called umbilical cord containing the electrical leads and through piping which enables an overpressure of 0.6 bar to be maintained within the pod relative to the surrounding water.

Once the missile is launched, this internal overpressure of 0.6 bar enables the pod to withstand the increased pressure resulting from discharge of the missile from the launch tube at a velocity of about 5 metres/sec.

Pulling out of the rear connectors frees the links with the fire control station and arms the electric circuit of barometric contact switch 14.

During the underwater part of the trajectory, the pressure inside the pod gradually drops; further, the pressure balancing valves 26 enable the gas contained in the pod to be gradually discharged and maintain an overpressure of 0.6 bar in the rear part thereof. Valves 19 set up an overpressure of 1.5 bars between bladders 17 and the rear of the pod.

On emergence from the water, the total pressure sensed by barometric contact switch 14 via pressure take off 15 drops from 3.1 bars absolute to 1 bar after the nose of the podded missile has travelled only a few centimetres, thereby closing the contacts of the barometric contact switch 14 which is time-delayed by about 0.5 to 1 second. After this time-lag has elapsed, all the explosive igniters are set off, whereby central lock 13 releases the forward latching of the four pod sections 2a through 2d at the same time as the rear straps 16 are similarly released.

Since the 3.1 bar abolute pressure in bladders 17 is greater than the 1.6 bar absolute pressure at the rear of the pod, the four pod sections 2a through 2d splay open at the nose end after the fashion of a flower bud.

As the pod opens, the connectors linking it to the missile are pulled out and a shunt (not shown) is eliminated, thereby igniting the missile propulsion unit for the aerial part of the trajectory.

In an alternative form of embodiment shown in FIGURE 8, pod 2 is made of an elastic material such as a rubberized fabric with an outer woven reinforcement 60a, but it must be stressed that such elastic pod sections 60 can be employed only with low inflation pressures, for in such cases the bladders 61 used with the pod must not be deformed unduly due to the pressure differential across the inside and the outside. The bladders 61 are interconnected by rigid longitudinal members 62 equipped with explosive locking devices identical to those used with rigid pods.

It is furthermore possible to fabricate the pod sections 60 from an elastic fabric the stiffness or thickness of which varies lengthwise along the missile whereby to achieve a shape giving a better underwater trajectory.

This type of pod will allow the pressure to be adjusted only very approximately, and will enable the launching submarine to maneuver in the vertical sense without the need to readjust the pressure.

FIGURE 9 shows diagrammatically yet another alternative constructional form enabling the filling pressure to be reduced, which is an advantage especially when launching takes place at great depth, for in such cases the form of embodiment described precedingly would require a large reserve supply of pressurized gas as well as a careful study of decompression conditions during the underwater ascent. Further, the missile components would be more complicated to design since they would have to withstand the inflation pressure.

In the constructional form of FIGURE 9, use is made of pod sections 102a to 102d strong enough to withstand the hydrostatic and hydrodynamic pressures without any internal pressurization. Since the structures of these sections will be required to withstand underwater pressures of as much as 25 to 30 bars if not more, use may be made of honeycomb material sandwiched between two panels, a void 103 being left around the missile 1. Said sections could alternatively be built up from frames and stringers.

The space between the missile and the pod, which is rendered leaktight by longitudinal seals 104, is filled with gas, at a pressure of 3.1 bars absolute for example, so as to enable the pod sections to be jettisoned when the missile emerges from the water.

The pod-forming panels may be rings consisting of three or four segments fitted with three or four manifolds for the intake and discharge of the gases under pressure. Each manifold is connected to the adjacent segment by explosive locking devices capable of causing the segments to separate on emergence from the water, such separation being achieved for instance by means of detonating cords.

Should it be deired to reduce the air volume (see FIG. 10), the space between missile 1 and pod 2 can be filled at least partly with any convenient material 75. Where the latter is a leakproof multicellular material such as plastic foam with closed cells, pod 2 may itself be made of that same material, provided of course that only low pressures are involved.

In all the forms of embodiment described precedingly, missile 1 may be equipped with fins 7 extending through the pod (see FIGS. 11 and 12), leaktightness being ensured in respect of each fin by pairs of longitudinal seals 71 positioned on opposite sides of the fin, between the latter and the corresponding pod section.

Manifestly, many detail changes and substitutions of parts may be made in the forms of embodiment hereinbefore described without departing from the spirit and scope of the invention.

What we claim is:

1. In an underwater propulsion system for bringing a missile into the vertical position and ejecting the same from the water, in combination, a missile casing, a pod surrounding said missile casing in spaced relation, said pod including a plurality of juxtaposed longitudinal sections, fluid tight means between said sections and between said sections and missile casing, locking means interconnecting said sections and casing, means for introducing a gas under pressure in the space between said casing and said sections, means for maintaining the pressure of said gas in said space at a value at least equal to or slightly higher than the hydrostatic pressure prevailing at the exterior of said sections, and controlling means sensitive to pressure change on emergence of the missile and pod from the water for releasing said locking means.

2. In a system as claimed in claim 1, wherein said locking means comprises, in combination, locating pegs carried internally on said pod sections, said casing having an outer surface with recesses therein for receiving said pegs, a central lock for mutually uniting said pod sections at a point proximate the nose of said pod, and straps girdling said pod, said central lock and straps being explosively releasable.

3. In a system as claimed in claim 2, wherein said central lock comprises a disc, an annular ridge formed on said disc, a groove segment embodied on the end of each pod section and adapted to form, when said sections are abuttingly joined together, a matching groove for receiving said annular ridge, a spring for extracting said annular ridge from said groove, a set of balls, housings therefor formed both in an extension rigid with said disc and in a member rigid with said pod, said member having an axial passage therethrough communicating with said ball housings, a rod slidably mounted in said passage and adapted to occlude the passageways between said housings and said passage, a cylinder forming an extension of said axial passage, and a piston rigid with said rod and slidably mounted in said cylinder, part of the volume of said cylinder being adapted to receive an explosive igniter extending thereinto.

4. In a system as claimed in claim 1, wherein said locking means is constructed to enable the sections to be separated from the missile casing under the pressure prevailing in said space when the locking means is released.

5. In a system as claimed in claim 1, gas retention means including inflatable bladders accommodated between said missile casing and said pod in the forward part of the latter, and means for maintaining gas in said bladders at an overpressure greater than another gas overpressure prevailing in the rear part of the space included between said missile casing and said pod.

6. In a system as claimed in claim 1, gas overpressure maintaining means including calibrated valves and seals positioned between said pod-forming sections and at places where said pod allows a rearward portion of said missile casing to protrude therefrom.

7. In a system as claimed in claim 5, bladder expansion limiting means comprising, adjacent the nose of said missile casing, a transverse disc sealingly mounted in said pod and, adjacent the rear of said casing, a segmented ring each of the segments of which is secured to the inner face of one of said pod sections.

8. In a system as claimed in claim 1, wherein said missile casing is formed with a pressure equalizing orifice therein.

9. In a system as claimed in claim 1, wherein said pod is ogival and formed for four substantially identical sections bounded by longitudinal planes substantially perpendicular to one another.

10. In a system as claimed in claim 1, wherein said pod is provided with pressurized gas inlets and electrical connectors adapted for connection to corresponding elements provided in an underwater launching station, said inlets and connectors being adapted to be pulled out from said corresponding elements upon launching of the missile.

11. In a system as claimed in claim 1, wherein said pod sections are made of an elastic material and are interconnected by rigid longitudinal members which carry said locking means and include inflatable portions.

12. In a system as claimed in claim 11, wherein said elastic material is formed by a rubberized fabric with an outer reinforcement the thickness of which varies along the length of said pod.

References Cited

UNITED STATES PATENTS

| | | | |
|---|---|---|---|
| 3,077,143 | 2/1963 | Drain et al. | 89—1.809 |
| 3,093,033 | 6/1963 | Drain et al. | 89—1.809 |
| 3,137,203 | 6/1964 | Brown | 89—1.81 |
| 3,153,979 | 10/1964 | Villers | 89—1.809 |
| 3,208,346 | 9/1965 | Penza et al. | 89—1.809 |
| 3,295,411 | 1/1967 | Lehmann | 89—1.81 |

SAMUEL W. ENGLE, *Primary Examiner.*